United States Patent [19]
Wunder

[11] Patent Number: 5,937,904
[45] Date of Patent: Aug. 17, 1999

[54] ELECTROMAGNETIC VALVE FOR HYDRAULIC MEDIA

[75] Inventor: Alfred Franz Wunder, Hettlingen, Switzerland

[73] Assignee: Waertsilae NSD Schweiz AG, Winterthur, Switzerland

[21] Appl. No.: 09/020,741

[22] Filed: Feb. 9, 1998

[30] Foreign Application Priority Data

Apr. 8, 1997 [EP] European Pat. Off. .............. 97810203

[51] Int. Cl.⁶ .................................................. F15B 13/044
[52] U.S. Cl. ............................... 137/625.65; 137/625.69; 251/129.1
[58] Field of Search ......................... 137/625.69, 625.65; 251/129.1

[56] References Cited

U.S. PATENT DOCUMENTS

| | | |
|---|---|---|
| 2,912,008 | 11/1959 | Blackburn . |
| 2,985,566 | 5/1961 | Tsien et al. ........................... 251/368 X |
| 4,951,878 | 8/1990 | Casey et al. . |
| 5,222,521 | 6/1993 | Kihlberg .............................. 137/625.69 |
| 5,479,901 | 1/1996 | Gibson et al. .................. 137/625.65 X |
| 5,507,316 | 4/1996 | Meyer ................................. 137/625.65 |
| 5,640,987 | 6/1997 | Sturman .......................... 137/625.65 X |
| 5,711,347 | 1/1998 | Sturman et al. ..................... 137/625.65 |

FOREIGN PATENT DOCUMENTS

| | | |
|---|---|---|
| 2290206 | 8/1973 | Germany . |
| 3608554A1 | 9/1987 | Germany . |
| WO 95/27865 | 10/1995 | WIPO . |

*Primary Examiner*—Gerald A. Michalsky
*Attorney, Agent, or Firm*—Townsend and Townsend and Crew LLP

[57] ABSTRACT

The electromagnetic valve comprises a valve housing, a valve slider and two electromagnets. The valve slider is displaceably arranged in a through-bore in the housing. The through-bore and the valve slider are provided with a hard coating in order to increase the number of switching movements.

4 Claims, 3 Drawing Sheets

(B)

(A)

ELECTROMAGNETIC VALVE FOR HYDRAULIC MEDIA

BACKGROUND OF THE INVENTION

The invention relates to an electromagnetic valve for hydraulic media.

Valves of this kind are known and contain a housing and a valve spool or slider which is displaceably arranged in the housing. An armature part with which an electromagnet is in each case associated is provided at each end face of the valve slider in such a manner that the valve body is in each case displaced when the electromagnet is excited. Short switching times can admittedly be achieved with a valve of this kind, but the wear, in particular at the control edges, is very pronounced, so that the valve must already be replaced after a relatively small number of switching movements.

SUMMARY OF THE INVENTION

The object of the invention is to improve an electromagnetic valve.

The advantages which can be achieved with the invention are to be seen in the fact that the sliding properties and the lifetime are improved by the hard coating and in that very short switching pulses are sufficient to actuate the valve due to minimization of the eddy current losses.

DESCRIPTION OF THE SPECIFIC EMBODIMENTS

The valve consists essentially of a valve part 1 and two drive parts 2, which are formed as electromagnets and are mounted on the valve part 1 by means of screws 3.

Figure 1:
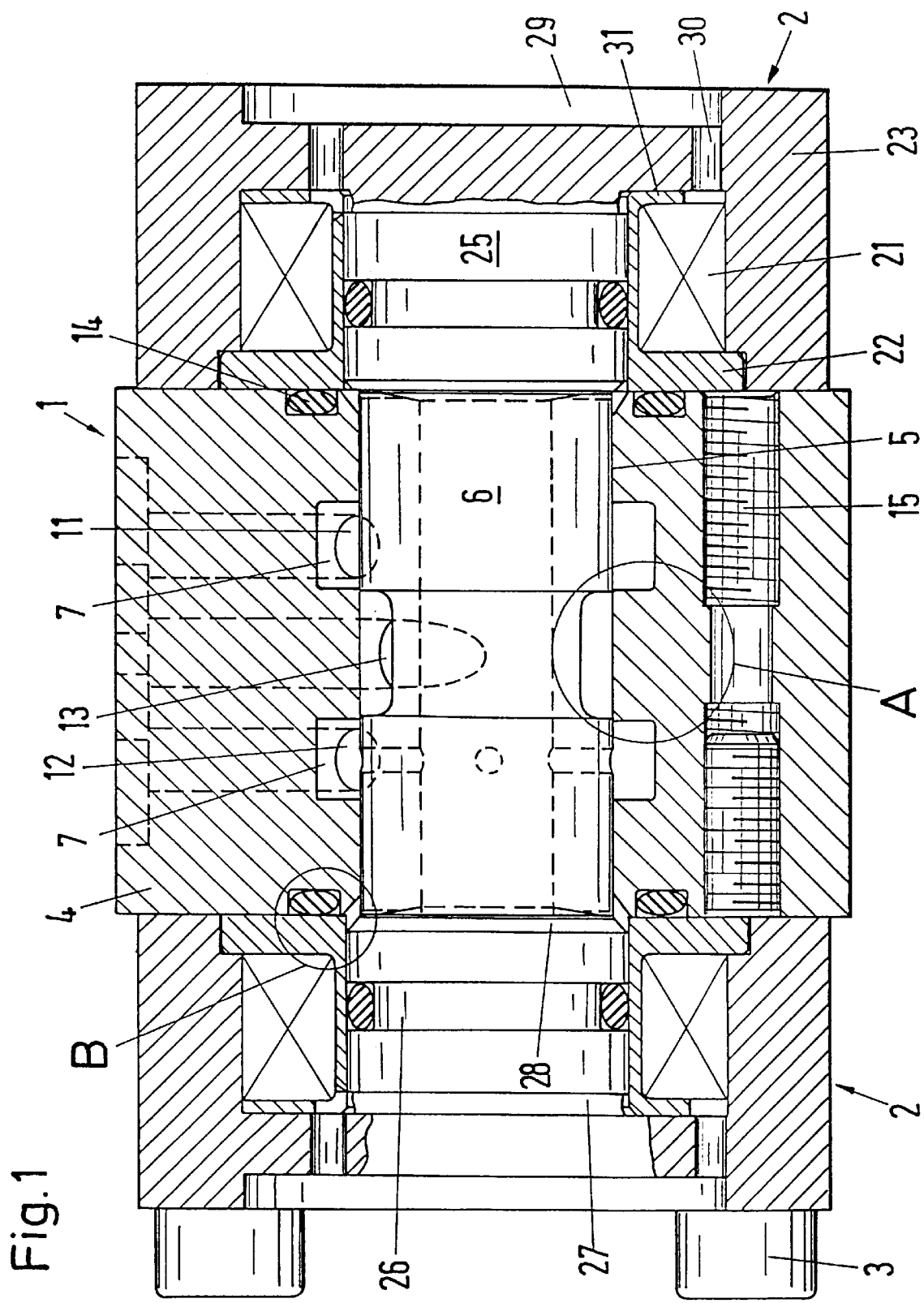
FIG. 1 is a section through an exemplary embodiment of a valve in accordance with the invention.
Figure 3:
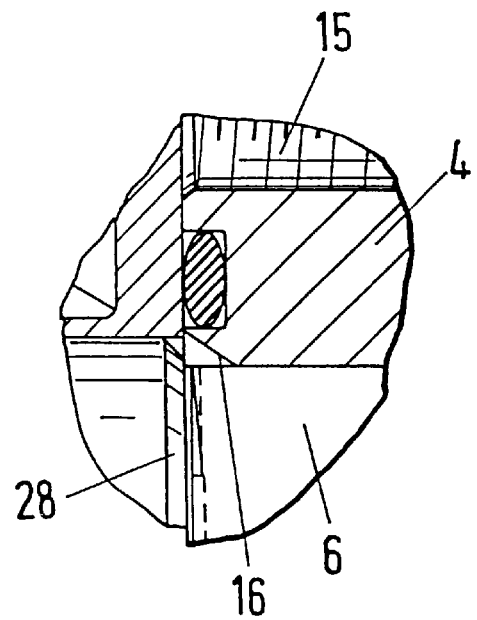
FIG. 3 is a detail "B" in FIG. 1 to an enlarged scale.
Figure 2:
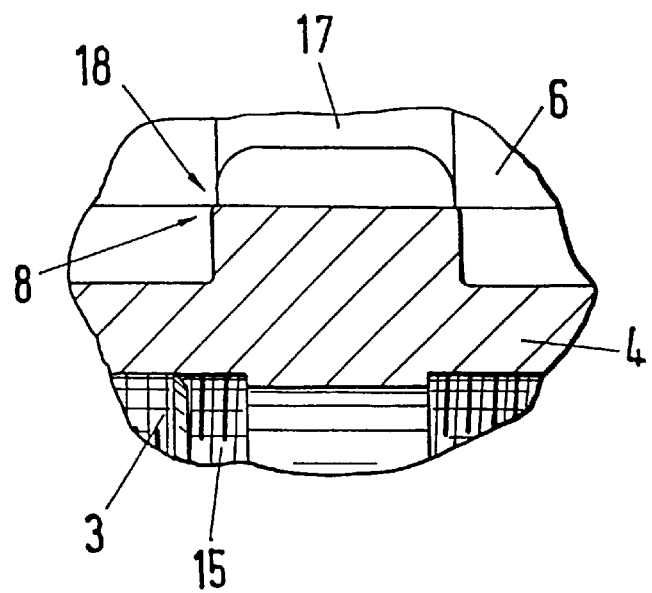
FIG. 2 is a detail "A" in FIG. 1 to an enlarged scale.

The valve part 1 consists of a housing 4 with a through-bore 5 along the cylinder axis and of a valve slider or spool 6 which is arranged to be movable back and forth within the through-bore. The housing 4 consists of a magnetic material. Two ring grooves 7 are formed in the housing 4 and are formed to extend in parallel in the through-bore 5 in such a manner that adjacently lying edges each form a control edge 8 (FIG. 2). Furthermore, a supply passage 11 and a return passage 12, each of which opens into a ring groove 7, and a user passage 13 which opens into the through-bore 5 are formed in the housing. Ring-shaped cut-outs are provided in the end faces of the housing 4 for receiving sealing rings 14. Four threaded holes 15 are formed in the housing 4 in order to mount the drive parts on the housing. A chamfer or bevel 16 is formed in the housing 1 at each of the two ends of the through-bore (FIG. 3).

Figure 5:
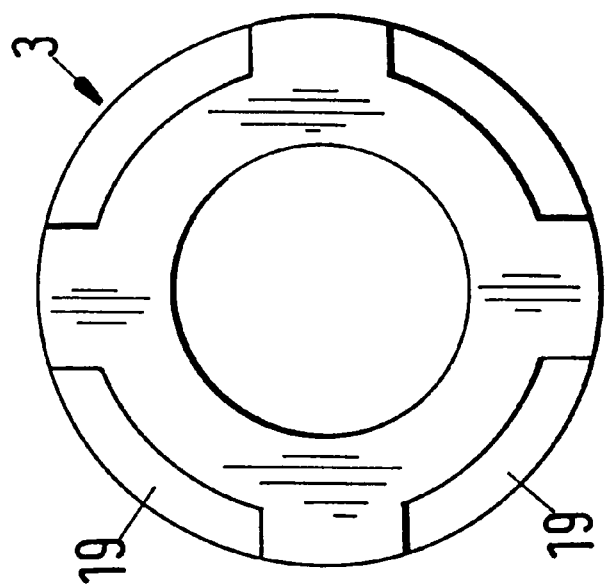
FIG. 5 is a view in the direction of the arrow C in FIG. 4.
Figure 4:
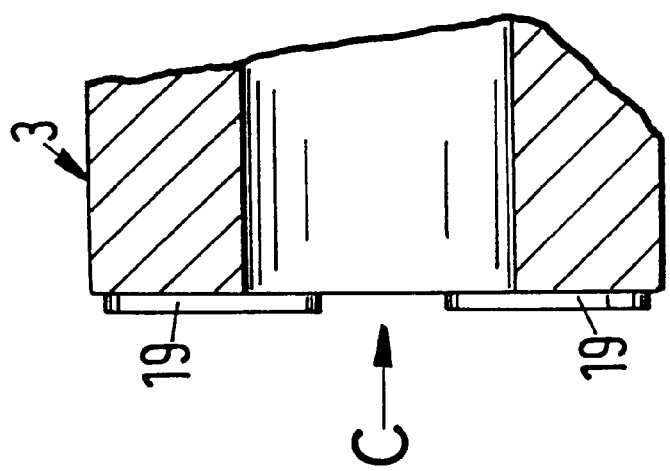
FIG. 4 is an end section of the valve slider in a sectional representation.

The valve slider 6 is cylindrical and has a ring-shaped groove 17 in such a manner that a ring chamber arises, the edges of which form the control edges 18 at the valve slider 3 (FIG. 2). The valve slider 6 is formed as a hollow cylinder and has radial bores which communicate with the return passage 12. A ring-shaped groove 17 is formed at the periphery so that a ring chamber arises, the edges of which form the control edges 18 at the valve slider 3 (FIG. 2). At the end faces of the valve slider 6 four free-standing support surfaces 19 are present (FIGS. 4 and 5), the spacing of which from the remaining end face amounts to approx. 0.05 mm. The valve slider consists of a magnetizable material.

The through-bore 13 in the housing 4 and the valve slider 6 and in particular the control edges 8, 18 are provided with a hard coating which consists, for example, of tungsten carbide or titanium nitride.

Each electromagnet consists of a coil 21, a coil body 22 on which the coil is directly wound and an armature part 23. The armature part 23 is formed as a rectangular parallelepiped and consists of a magnetizable material. A ring-shaped cut-out is formed in the armature part 23 beginning at one end face in such a manner that a cylindrical projection 25 is present at the center. A groove for receiving a sealing ring 26 is formed in the projection. A furrow 27 is formed at the base of the groove. Furthermore, the projection 25 has a conical section 28 at the free end. The coil body 22 with the coil 21 is arranged in the ring-shaped cut-out. A cylindrical cut-out 29 is formed at the other end face of the armature part 23. Passage holes 30 for the coil connection leads are formed beginning at this cut-out and extend through the flange part 31 of the coil body 12.

An electromagnet is excited in each case to actuate the valve. The valve slider 6 is drawn up to the armature part 23 by the magnetic field until the surfaces of the free-standing sections 19 lie in contact with the end face of the armature part. In order to ensure the drawing up of the valve slider 3, the pressure medium, e.g. oil, which has collected in the cavity of the valve slider between the valve slider 3 and the armature part 23 must be displaced. The functioning of the valve is thereby improved and shorter switching times are achieved. If the excitation voltage is switched off, the valve slider is held fast by the residual remanence. The excitation current produces eddy currents in the coil body. In order to minimize the eddy current losses the coil body consists of titanium, which has a low electrical conductivity of $0.23 \cdot 10^5$ $(\Omega\ \text{cm})^{-1}$.

The electromagnetic valve comprises a valve housing 4, a valve slider 6 and two electromagnets 2. The valve slider 6 is displaceably arranged in a through-bore 13 in the housing. The through-bore and the valve slider are provided with a hard coating in order to increase the number of switching movements.

I claim:

1. An electromagnetic valve for hydraulic media comprising:

a valve housing having two ends with a through-bore extending therebetween;

a valve slider movably disposed in the through-bore of the valve housing, the valve slider being cylindrical and having an outer diameter; and two electromagnets disposed adjacent the two ends of the valve housing, the valve slider being moved when one of the electromagnets is excited and being held fast by a residual remanence when the excitation to the electromagnet is removed, wherein the through-bore of the housing and the valve slider are coated with a hard coating, and the valve housing has a length between the two ends of less than 2.5 times the outer diameter of the valve slider.

2. An electromagnetic valve in accordance with claim 1 wherein the valve slider has two end faces and at least two free-standing support sections formed at the two end faces, the valve slider being movable to bring the free-standing support sections at each end face into active contact with one of the electromagnets.

3. An electromagnetic valve in accordance with claim 1 wherein the hard coating is selected from the group consisting of titanium nitride and tungsten carbide.

4. An electromagnetic valve in accordance with claim 1 wherein each electromagnet has a coil body and a coil wound on the coil body, the coil being formed with a material with an electrical conductivity less than $3.00 \times 10^5$ $(\Omega cm)^{-1}$.

* * * * *